United States Patent [19]

Puglia et al.

[11] Patent Number: 4,500,547
[45] Date of Patent: Feb. 19, 1985

[54] REDUCED-SHRINK BUBBLE GUM

[75] Inventors: Wayne J. Puglia, Bayville, N.Y.; Gary S. Kehoe, Ridgefield, Conn.; K. Warren Clark, Brewster, N.Y.

[73] Assignee: Nabisco Brands, Inc., Parsippany, N.J.

[21] Appl. No.: 589,968

[22] Filed: Mar. 15, 1984

Related U.S. Application Data

[63] Continuation-in-part of Ser. No. 413,053, Aug. 30, 1982, abandoned.

[51] Int. Cl.³ .............................................. A23G 3/30
[52] U.S. Cl. ........................................ 426/3; 426/5; 426/6; 426/548
[58] Field of Search ............................... 426/3, 4, 5, 6

[56] References Cited

U.S. PATENT DOCUMENTS

| | | | |
|---|---|---|---|
| 3,974,293 | 8/1976 | Witzel | 426/4 |
| 3,984,574 | 10/1976 | Comollo | 426/4 |
| 4,217,368 | 8/1980 | Witzel et al. | 426/5 |
| 4,241,090 | 12/1980 | Stroz | 426/4 |
| 4,241,091 | 12/1980 | Stroz | 426/4 |
| 4,248,894 | 2/1981 | Mackay et al. | 426/3 |

*Primary Examiner*—Jeanette Hunter
*Attorney, Agent, or Firm*—Richard Kornutik

[57] ABSTRACT

A reduced-shrink chewing gum composition having good film-forming characteristics which is prepared with a relatively high amount of inert inorganic filler and a non-styrene butadiene gum base. The filler material is included as a component of the gum base and as a component added after formation of the gum base.

20 Claims, No Drawings

REDUCED-SHRINK BUBBLE GUM

CROSS REFERENCE TO RELATED PATENT APPLICATIONS

This patent application is a continuation-in-part of U.S. patent application Ser. No. 413,053 filed Aug. 30, 1982 now abandoned.

The present invention relates to the art of chewing gum composition and, in particular, to a novel chewing gum composition having improved softness, good film-forming attributes, and decreased shrink characteristics.

Chewing gum compositions, as they are known today, generally comprise a water-soluble flavor portion which is dissipated over a period of time by chewing, and a gum base portion which is insoluble and inert, and is retained in the oral cavity throughout mastication. Depending on the desired effect of the ultimate chewing gum product, the different portions are composited with components having characteristics necessary to achieve the desired gum product.

The gum base portion, for example, usually comprises primarily an elastomeric component, which can be either natural or synthetic, or a combination thereof, and a resinous component. Elastomers provide the insoluble portion with resiliency for continuous recovery from deformation caused by chewing, and the resin provides the cud with uniform plasticity. These components must be compatibilized in order to produce a single homogeneous cud which has the desired properties throughout. This thoroughly mixed physical state is not always easily achieved because of the relative immiscibility of certain elastomers and resins. In order to overcome problems of compatibility, certain unique plasticizers may be used to enhance the homogeneity attainable in a gum base. See application Ser. No. 377,804, filed May 13, 1982, which is incorporated herein by reference.

Another component which may be included in the gum base is an inert inorganic filler component such as calcium carbonate, talc (3MgO 4SiO$_2$ H$_2$O), magnesium carbonate, etc. which is included in amounts up to about 40% by weight of the gum base. (Unless otherwise indicated all percentages used herein refers to percent by weight). Since filler material is, in form, a particulate material, the inclusion of such particulate material in the gum base tends to cause a discontinuity in the cud formed during the chewing of the gum product, thereby limiting the amount of particulate filler which can be incorporated into the gum base without causing separation of the cud upon chewing.

For example, U.S. Pat. No. 3,984,574 to Comollo discloses a gum base including polyisobutylene in combination with polyvinyl acetate which requires the use of additional components such as hydrogenated or partially hydrogenated vegetable oils or animal fats in an amount of 5-50% of the base, and the use of filler in an amount of 5-40% of the gum base. Inasmuch as the gum base normally represents no more than about 25%-30% of the total gum composition, the amount of filler present in the overall chewing gum composition would be no more than about 12%, and would normally be about 7.0%.

The soluble portion of the chewing gum composition comprises sweeteners, flavorants, and colorants. Upon chewing the gum composition, these components are solubilized and digested, leaving a cud volume of only about 30% the original size of the initial unit of chewing gum. Consequently, the consumer is left with an unsatisfactory reduced-size piece of gum which, because of the loss of sweeteners, rapidly hardens.

Attempts to overcome this disappointing loss of cud volume in chewing gum have not been entirely successful. Increasing the amount of insoluble gum base in proportion to the soluble portion results in a commensurate reduction in the amount of sugar in the gum composition which then requires the use of expensive intense sweeteners to maintain the overall sweetness level.

In U.S. Pat. No. 4,252,830 to Kehoe, et al. a substantially calorie-free chewable flavored chewing gum base essentially free of water-soluble components is disclosed which includes inert fillers in amounts of at least 50% by weight, and preferably from about 55 to about 85% by weight, and at least 10% by volume of entrapped air voids. The overall gum composition of Kehoe, et al., however, does not include sugar and, consequently, must include an intense sweetener. Furthermore, there is no indication in the Kehoe, et al. patent that the styrene-butadiene base disclosed therein has good film-forming capabilities while maintaining a soft texture.

U.S. Pat. No. 4,065,579 to Mackay discloses the use of a chalk (CaCO$_3$) filled chewing gum base which is used with a sweetening agent and, optionally, food acids which are reactive with the filler. To prevent a reaction between the filler and the sweetening agent or the food acids, Mackay requires that one or more of the reactive materials be coated with an edible coating agent. The maximum amount of filler that is used in the Mackay gum product is about 25 weight %, since the only specific disclosures of the amounts of filler to be used indicate that 0 to 50% of the gum base may be chalk (column 5 lines 15–18) and that about 10 to 50% of the chewing gum product may be the chalk containing gum base (column 3, lines 60–63). All the Mackay examples exemplifying his invention use only about 4 to 5% of chalk in his chewing gum products, and all is used in the gum base in such examples. Chalk is the only filler material, used in filler amounts, which is employed in the Mackay compositions.

U.S. Pat. Nos. 4,241,090 and 4,241,091 to Stroz et al. disclose the preparation of certain non-adhesive type chewing gums. The gum products of U.S. Pat. No. 4,241,090 are formed from about 10 to 35 weight % of gum base (column 4, line 57) and wherein the gum base contains about 0 to 75% weight % inorganic bulking agents or fillers (column 3, lines 53–64), which indicates that the maximum amount of inorganic filler used in the gum products of U.S. Pat. No. 4,241,090 is about 26 weight %. The calorie free gum products of U.S. Pat. No. 4,241,091 are formed from about 30 to 50 weight % of gum base (column 6 lines 7–8) and wherein the gum base contains about 10 to 100 weight % of inorganic bulking agents or fillers (column 5, lines 3 to 5), which indicates that the gum products of U.S. Pat. No. 4,241,091 could contain as much as 50% of such fillers. This would require, however, that the gum base contain 100% of such fillers. This is not feasible, however, if the gum base is to provide any chewing properties to the gum product. The examples of U.S. Pat. No. 4,241,091 disclose the use of about 10–30 weight % of inorganic filler. The formulations of the Stroz et al. patents also require the use of various combinations of slip agents, thickening agents, and/or water. These slip agents and thickening agents are organic in nature and include, as slip agents or texturizing agents alpha cellulose, texturized vegetable protein, fish protein concentrate, bran, citrus peel, cellulose, pectin, citrus pulp, other fruit or vegetable pulp or mixtures thereof; and as thickening agents hydrolyzed cereal solids, maltodextrin, modified food starch, low D.E. corn syrup solids, alginates, carrageenan, xanthan gum, gelatin, carob, tragocanth, locust bean and other water soluble gums, methyl cellulose and carboxymethyl cellulose.

OBJECTS OF THE PRESENT INVENTION

It is an object of this invention to provide a chewing gum composition having excellent film-forming properties.

It it another object of the present invention to provide a chewing gum composition having good softness which is sustained over a period of time.

It is a further object of the present invention to provide a chewing gum composition which requires less sugar to attain acceptable levels of sweetness in the absence of intense sweeteners.

It is a further object of the present invention to provide a chewing gum composition which can be made with a relatively high inorganic filler concentration without the need for coating the filler and/or sweetener used therewith, and without the need for added water, or organic fillers or thickening agents.

SUMMARY OF THE INVENTION

In accordance with the present invention a reduced-shrink chewing gum composition having good film-forming characteristics is provided by including an increased amount of inert inorganic filler material such as calcium carbonate in both the gum base and as a replacement component for some of the water-soluble flavorant type materials ordinarily added to the gum base. The present invention provides a reduced-shrink chewing gum composition having good film-forming characteristics comprising from about 12% to about 44%, inert inorganic filler based on the total weight of the gum composition, and a non-styrene butadiene base in an amount of from about 15% to about 30% by weight of the gum composition.

The chewing gum compositions of the present invention are thus formed from a chewing gum base composition and additional materials which may be called a flavorant composition. The chewing gum compositions is formed from about 10 to 40, and preferably about 15 to 30 weight % of the gum base composition and about 60 to 90 and preferably about 70 to 85 weight % of the flavorant composition. The compositions of the present invention are made without added water or slip agents or thickening agents.

The filler which is employed in the compositions of the present invention is used in an amount which is about 12 to 44, and preferably of about 13 to 40.5 weight % based on the weight of the entire chewing gum composition. The gum base will comprise about 20 to 35 weight % of filler in the compositions of the present invention. Since such compositions will comprise about 10 to 40, and preferably about 15 to 30, weight % of gum base, the amount of filler in the gum base, based on the weight of the entire composition, will be about 2 to 14, and preferably about 3.0 to 10.5, weight %. The amount of filler used in the flavorant composition will be about 10 to 30 weight % of the total amount of filler in the gum product.

Fillers suitable for use in the present chewing gum composition include, but are not limited to, calcium carbonate, aluminum hydroxide, alumina, magnesium carbonate, dicalcium phosphate, talc (3MgO 4SiO$_2$ H$_2$O), magnesium trisilicate, magnesium hydroxide, aluminum silicates, and silica gel. Calcium carbonate is preferred. However, where acid flavors and/or acid sweeteners, such as the free acid form of saccharin, acid cyclamate or Aspartame R are employed in the final chewing gum it is preferred to employ a non-chalk filler, preferably talc. The fillers are thus, preferably, inorganic mineral type fillers.

The gum base includes non-SBR type masticatory substances of synthetic origin, which may be elastomers such as polyisobutylene, polyisoprene, isobutylene-isoprene copolymer, or non-elastomers such as polyvinyl acetate, polyethylene and petroleum wax, as well as masticatory substances of natural origin which all elastomers and which include materials such as rubber latex solids, chicle, crown gum, nispero, rosidinha, jelutong, pendare, perilo, niger gutta, tunu, etc. This masticatory substance is employed in an amount within the range of from about 5% to about 20% by weight of the gum base where it is elastomeric and about 2 to 25% where it is non-elastomeric, whether they are used together or independently of each other.

The water-insoluble gum base may consist of any of the various bases disclosed for example in U.S. Pat. Nos. 3,052,552 and 2,197,719. Typical ingredients included in gum base compositions are the following:

|  | Parts by Weight |
| --- | --- |
| Base I | |
| Ester gum | 88 |
| Rubber latex solids | 10 |
| Lecithin | 2 |
| Base II | |
| Chicle | 30 |
| Jelutong | 60 |
| Gutta soh | 8.5 |
| Lecithin | 2 |
| Base III | |
| Partially oxidized chicle | 98 |
| Lecithin | 2 |
| Base IV | |
| Jelutong (dry) | 80 |
| Gutta siak | 18 |
| Lecithin | 2 |

In addition, the gum base includes plasticizers for the masticatory gum base components such as those shown in application Ser. No. 377,804, filed May 13, 1982 in an amount of form about 2% to about 15% of the gum base.

The gum base can also include waxes which serve as lubricants and should have a melting point of above about 35° C. and preferably above about 50° C. Examples of such waxes include candelilla wax, carnauba wax, ozokerite, oricury, microcrystalline wax, refined paraffin wax and the like. The waxes are employed in an amount within the range of from about 0 to about 18% by weight of the gum base, and preferably from about 3 to about 12%. The preferred waxes are microocrystalline wax and paraffin wax employed in combination so that from about 0 to about 18% (based on the weight of the gum base) of the microcrystalline wax is employed with from about 0 to about 18% (based on the weight of the gum base) of the paraffin wax. The waxes are found to reduce the tackiness of the final gum composition without significantly reducing cohesivity thereof.

An emulsifier can also be included to impart hydrophilic/hydrophobic balance to the gum base so that saliva will be absorbed thereby making the gum base slippery; the emulsifier will be employed in amounts ranging from about 0 to about 10% by weight of the gum base, and preferably from about 3 to about 9%. Examples of such emulsifiers include glyceryl monostearate, phosphatides, such as lecithin and cephalin, Tweens, Spans and mixtures thereof.

In addition, the gum base can include colorants/pigments, such as titanium dioxide, and anti-oxidants (when necessary to stabilize non-inventive ingredients) in an amount up to 1000 ppm of the gum base, such as butylated hydroxyanisole, butylated hydroxy toluene, and propyl gallate.

The following is a general gum base formulation in accordance with the present invention.

| Component Base | % by Weight of Gum |
| --- | --- |
| Elastomeric Masticutory Substance | 5% to 20% |
| Non-elastomeric masticatory substance | 2% to 25% |
| Plasticizer - Triacetin, acetylated monoglyceride, polylimonene, petrolatum, etc. | 1% to 5% |
| Filler - CaCO₃, Talc, etc. | 20% to 35% |
| Waxes | 0 to 18% |
| Texturizing/Emulsifying agents | 0 to 10% |
| | 100% Total |

In any event, the gum bases useful in the present invention can be preformed before forming a chewing gum, and will be present in an amount within the range of from about 10 to about 40% and preferably from about 15 to about 30% by weight of the chewing gum.

The chewing gum of the invention may be of the sugar-containing or sugarless variety. Examples of sweeteners which may be employed include sugars, for example, monosaccharides, of 5 or 6 carbon atoms, such as arabinose, xylose, ribose, glucose, mannose, galactose, fructose, dextrose, or sorbose or mixtures of two or more of the foregoing monosaccharides; disaccharides, for example, sucrose, such as cane or beet sugar, lactose, maltose or cellobiose; polysaccharides, such as partially hydrolyzed starch or dextrin, as well as sugar alcohols, such as sorbitols, mannitol, xylitol, mixtures thereof, as well as hydrogenated starch hydrolysates or isomaltitol, and mixtures of two or more of the above sugars and/or sugar alcohols.

Any of the above sugars may be present in an amount of within the range of from about 30% to about 70% and preferably from about 55% to about 65% by weight of the chewing gum. The sugar alcohols, where present, will also be employed in an amount of from about 30% to about 70% and preferably from about 55% to about 65% by weight of the chewing gum.

The sugar or sugar alcohols need not be present in a sugarless chewing gum product.

Surprisingly, the amount of sugar employed in the gum composition of the present invention can be reduced by about 15-25% of the amount normally employed without detracting from the level of sweetness of the gum composition.

While it is not necessary to use intense sweeteners to maintain adequate sweetness, the chewing gum of the invention may also contain in lieu of or in addition to any of the above sugars or sugar alcohols an artificial intense sweetener, such as, for example, Aspartame ®, cyclamate, or a saccharin or other intense sweetener as set out hereinafter, the artificial sweetener being present in an amount of from about 0 to about 1.5% by weight, and preferably, from about 0.05 to about 0.3% by weight of the chewing gum.

The intense sweeteners may be of artificial or of natural origin. Examples of intense sweeteners which may be employed herein include sodium, calcium or ammonium saccharin salts, dihydrochalcones, glycyrrhizin, dipotassium glycyrrhizin, glycyrrhizic acid ammonium salt, L-aspartyl-L- phenylalanine methyl ester (aspartame), the sodium, ammonium or calcium salt of 3,4-dihydro-6-methyl-1,2,3,-oxathiazine- 4-one-2,2-dioxide, the potassium salt of 3,4-dihydro-6-methyl-1,2,3-oxathiazine-4-one-2,2-dioxide (Acesulfame-K), as well as *Thaumatococcus daniellii* (Thaumatin I and II), *Stevia rebaudiana* (stevioside), *Richardella dulcifica* (Miracle Berry), *Dioscoreophyllum cumminsii* (Serendipity Berry), cyclamate salts, and the like or mixtures of any two or more of the above.

The chewing gum of the invention may include flavoring, such as sour or fruit flavoring or non-acid or mint flavoring in an amount ranging from about 0.2 to about 3%, and preferably from about 0.5 to about 2%, by weight, of the final chewing gum product. The flavoring may comprise synthetic flavors and oils derived from plants, leaves, flowers, fruit, etc. Representative fruit flavor adjuncts include acids, such as adipic, citric, succinic and fumaric acid, and citrus oils, such as lemon oil, orange oil, lime oil, grapefruit oil, and fruit essences, such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewable gum base with or without conventional preservatives.

Finally, an additional amount of inert inorganic filler is also included in the normally water-soluble components added to the preformed gum base. The amount of additional filler material added with the water-soluble components can be from about 10% to about 30% by weight based on the weight of the chewing gum composition, thereby raising the overall amount of filler to from about 12% to about 44% by weight of said gum composition, and preferably to about 13.0 to 40.5% by weight and most preferably to about 16% to about 25%.

The following is a general chewing gum composition formula in accordance with the present invention.

| Component | % by Weight of Chewing Gum Composition |
| --- | --- |
| Gum Base in Accordance With the Invention (with 2-14% filler) | 15% to 30% |
| Sugar Pulverized | 0% to 70% |
| Corn Syrup | 0 to 15% |
| Filler (added with flavorants) | 10% to 30% |
| Flavor | 0.2 to 3% |
| Emulsifiers | 0 to 4% |
| Color | 0 to 2% |
| Intense Sweeteners | 0 to 1.5% |

-continued

| Component | % by Weight of Chewing Gum Composition |
|---|---|
| Sugar Alcohol(s) | 0 to 15% |
| | 100% Total |

In selecting the various components of both the gum base composition, and the flavorant composition which are to be added to the chewing gum composition, it is to be understood that one of more of each of the various types of such components, ie, masticatory material, plasticizer, wax, filler, flavor, sweetener, etc., may be used in such compositions.

Traditionally, cud volume, or insoluble base materials remaining after extraction of soluble ingredients, has been considered as one measure of chewing gum acceptability. In the case of bubble gums, cud volume is critical since it determines the size of bubbles and, to some extent, the ease with which they may be blown. Cud volume can be determined by the difference in weight of a gum cud in air and in a liquid of known density. Typically, a piece of bubble gum weighing 8.14 grams and having a volume of 6.54 cm$^3$ yields a cud volume of about 2.26 cm$^3$ after chewing for ten minutes, which is a 65.4% volume loss. A sample of bubble gum weighing 8.23 grams produced in accordance with the present invention, and having an initial volume 6.26 cm$^3$, yields a cud volume of 3.99 cm$^3$ after ten minutes of chewing—a volume loss of only 36.3%. See Table I.

TABLE I

| | Typical Bubble Gum | Bubble gum of the Invention |
|---|---|---|
| Piece Weight | 8.14 gm | 8.23 gm |
| Cud Weight (After 10 minutes of Chewing) | 2.37 gm | 4.18 gm |
| Piece Volume | 6.54 cm$^3$ | 6.26 cm$^3$ |
| Cud Volume (After 10 minutes of Chewing) | 2.26 cm$^3$ | 3.99 cm$^3$ |
| Volume Loss | 65.4% | 36.3% |

Liquid used to measure change in volume was n-butylphthalate which has a density of 1.048 gm/cm$^3$ The present chewing gum composition not only possesses superior film-forming properties but also a significant reduced-shrink feature by which the size of the insoluble cud remaining after mastication is sustained at from about 60% to about 70% by volume of the original size of a unit of chewing gum produced with the composition. This is compared to the normal cud volume of from about 30% to about 37% of original gum unit size remaining after masticating the water-soluble components out of chewing gum, an increase of about 50%.

Furthermore, the sweetness perception of the present chewing gum composition is maintained at the same level as chewing gum containing approximately 10-20% more water soluble or non-intense sweetener.

Another desirable attribute of the present invention is that the resulting chewing gum is initially very soft, and remains very soft after sustained chewing which is unexpected in view of the fact that increased filler levels in polymeric compositions have in the past been associated with increased hardness.

For a better understanding of the present invention, together with other and further objects, reference is made to the following descriptions of specific examples and its scope will be pointed out in the appended claims.

EXAMPLES OF THE INVENTION

The chewing gum of the present invention was prepared in accordance with the following formulae.

| GUM BASE | |
|---|---|
| Component | % by Weight of Gum Base |
| Polyisobutylene Elastomer | 12.5% |
| Polyvinyl Acetate (M.W. 20,000–40,000) | 32.5% |
| Plasticizers - e.g., Polylimonine, Glyceryl, Triacetate, and Acetylated Monoglyceride | 15.25% |
| Calcium Carbonate (CaCO$_3$) Filler | 29.5% |
| Waxes | 10.50% |

| CHEWING GUM COMPOSITION | |
|---|---|
| Component | % by Weight of Chewing Gum Composition |
| Gum Base (as described immediately above) | 22.50% |
| Sugar Pulverized | 51.0% |
| High Fructose Corn Syrups 90 DE | 4.0% |
| Sorbitol Syrup | 8.0% |
| Calcium Carbonate (CaCO$_3$) Filler | 13.5% |
| Flavor | 0.8% |
| Color | 0.1% |

In order to prepare the gum base the ingredients were mixed in a sigma-blade mixer a temperature of about 120° C. by introducing the polyisobutylene elastomer along with a portion of an appropriate plasticizer, followed by a first portion of the polyvinyl acetate and the filler. More plasticizer was then added with the remaining polyvinyl acetate, filler, as well as the wax.

The gum base prepared as described above was then melted in a mixer at 160° F. and a small portion of the pulverized sugar, high fructose syrup, and filler were added with mixing over a period of 4-6 minutes. Thereafter, the remaining ingredients were added according to conventional chewing gum making practice to form a reduced-shrink, soft bubble gum having an excellent film-forming property as well as good sweetness perception.

In order to demonstrate the unexpected results relative to producing a soft high-filler content chewing gum by use of the present invention, tests were conducted on samples of the gum produced in accordance with the previous Example. One type of test which can be made to determine softness is a test measuring the degree of hardness, i.e., resistance of a material to local deformation. Hardness tests usually result in measurements indicating the depth of penetration of an indentor or probe under a specific set of conditions.

Hardness was measured on a Thwing-Albert Electronic Tensile Tester Model Q.C. II, specially modified to measure compression of chewing gum. The chewing gum sample was placed between two metal plates measuring 1" × 1¼". The gum, originally ½" in thickness was compressed to one-half of its original thickness or ¼" at a speed of 20 in/min. These tests were conducted at room temperature (24.5° C.) using a 100 lb capacity load cell. The measurement obtained was the peak force (in lbs) required to compress a chewing gum sample aged three-months to one half of its original thickness.

TABLE I

| | Compression Test Peak force (lbs) required to compress sample to ½ original thickness | |
|---|---|---|
| Sample | Control* | Reduced-shrink Bubble gum |
| A | 35.4 | 29.2 |
| B | 33.8 | 26.2 |
| C | 40.3 | 27.5 |
| D | 39.0 | 29.7 |
| E | 35.2 | 25.7 |
| Avg. | 36.74 | 27.66 |

*24 Base which includes 30% filler
58% Sugar
17% Corn Syrups
0.8% Flavor
0.1% Color As evident from the data, the samples exhibited readings which were 24.7% softer than the control product.

Perception testing was also conducted in order to determine how the chewing gum of the invention compared to a similar non-SBR low filler chewing gum. The formula of the comparative gum composition was as follows:

| Component | % by Weight |
|---|---|
| COMPARISON GUM BASE | |
| Polyisobutylene | 12.5% |
| Polyvinyl acetate, MW. 2,000–4,000 | 32.5% |
| Plasticizers/Waxes/etc. | 25.75% |
| Filler, CaCO₃ | 29.25% |
| COMPARISON CHEWING GUM COMPOSITION | |
| Gum Base | 24% |
| Sugar Pulverized | 58% |
| Corn Syrups | 17% |
| Flavor | 0.8% |
| Color | 0.1% |

The results of these tests, which were conducted on a sample population of 186 persons, are shown below in Table II.

TABLE II

| | Chewing Gum of the Invention (%) | Comparison Chewing Gum (%) |
|---|---|---|
| Initial Softness | 54 | 46 |
| Larger Bubble-Blowing Characteristic | 53 | 47 |
| Easier Bubble-Blowing | 55 | 45 |
| Long Lasting Softness | 56 | 44 |
| Long Lasting Flavor | 53 | 47 |
| Better Initial Chew | 52 | 48 |
| Size Retention | 58 | 42 |

These results clearly show that comparable quality chewing gum is achieved by use of the present invention wherein inexpensive filler can be used to replace a portion of the sugar content.

The same chewing gum composition as outlined above may be prepared utilizing other non-SBR type bases, such as polyisoprene, isobutylene-isoprene copolymer, alone or in combination with each other or with elastomers of natural origin as previously described herein Thus, while there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. In a non-styrene-butadiene based chewing gum composition having high film-forming characteristics, a high inorganic filler content in an amount of from about 12% to about 44% based on the weight of said overall chewing gum composition, a non-styrene-butadiene gum base in an amount of from about 15% to about 30% by weight of said chewing gum composition, and water-soluble sweeteners, the improvement comprising adding said filler in an amount from about 20% to about 35% by weight of said gum base, and adding the remainder of said filler step-wise as a component of the overall gum composition in an amount of from about 10% to about 30% by weight based on the weight of said gum composition, whereby said improvement provides said gum with increased softness without loss of film-forming characteristics, high cud volume retention during chewing, and a reduced requirement for water-soluble sweeteners without loss of perceived sweetness.

2. The chewing gum composition of claim 1 wherein said filler is selected from the group consisting of calcium carbonate, aluminum hydroxide, alumina, magnesium carbonate, dicalcium phosphate, talc, magnesium trisilicate, magnesium hydroxide, aluminum silicate and silica gel.

3. The chewing gum composition of claim 2 wherein said filler is calcium carbonate.

4. The chewing gum composition of claim 1 wherein said gum base is based on an elastomeric masticatory substance selected from the group consisting of polyisobutylene, polyisoprene, and isobutylene-isoprene copolymer.

5. The chewing gum composition of claim 4 wherein said masticatory substance is polyisobutylene.

6. The chewing gum composition of claim 5 wherein said gum base further comprises elastomeric masticatory substances of natural origin selected from the group consisting of rubber latex solids, chicle, crown gum, nispero, rosidinha, jelutong, perdare, perillo, niger gutta, and tunu.

7. The chewing gum composition of claim 1 wherein the components added after formation of said gum base further comprise a sweetener selected from the group consisting of sugar, hydrogenated starch hydrolysates, sugar alcohols, and corn syrup, in an amount of from about 35% to about 70% by weight based on the weight of said gum composition.

8. The chewing gum composition of claim 1 which further comprises intense sweeteners of artificial or natural origin.

9. The chewing gum composition of claim 1 which is prepared in the absence of intense sweeteners of artificial or natural origin.

10. The chewing gum composition of claim 1 wherein the peak force required to compress a sample aged three months to one-half its original thickness is no more than about 30 lbs. at a speed of 20 inches per minute in a tensilometer adapted to measure the compression of chewing gum using a 100 lb. capacity load cell.

11. In a filled, non-styrene-butadiene based chewing gum composition have high film-forming and good sustained softness characteristics in cud form and comprising a total of about 12 to 44 weight % of inert inorganic filler and formed from a flavorant composition comprising uncoated sweetener, flavorant and colorant, and a preformed gum base composition comprising elastomeric non-styrene-butadiene component, resinous component, plasticizer and inert inorganic filler, the improvement which comprises forming said gum without solvent, slip agents or thickening agents and by adding said total amount of filler to said gum composition by adding about 2 to 14 weight % of uncoated filler in said base gum composition and about 10 to 30 weight % as uncoated filler in said flavorant composition and uncombined with said sweetener.

12. A composition as in claim 11 which is a bubble gum composition.

13. In a filled non-styrene-butadiene based chewing gum composition having high film-forming and good sustained softness characteristics in cud form and comprising a total of about 12 to 44 weight % of inert inorganic filler and formed form a flavorant composition comprising uncoated acidic or non-acidic sweetener, flavorant and colorant, and a preformed gum composition comprising elastomeric non-styrene-butadiene component, resinous component, plasticizer and inert inorganic filler, the improvement which comprises forming said gum without solvents, slip agents or thickening agents and by adding said total amount of filler to said gum by adding about 2 to 14 weight % of uncoated filler in said base gum composition and about 10 to 30 weight % as uncoated filler in said flavorant composition and uncombined with said sweetener, and with the proviso that where said sweetener is an acidic sweetener, said filler is other than calcium carbonate.

14. A composition as in claim 13 which is a bubble gum composition.

15. A composition as in claim 13 in which a nonacidic sweetener is used.

16. A composition as in claim 15 in which $CaCO_3$ is employed as said filler.

17. A composition as in claim 13 in which an acidic sweetener is used.

18. A composition as in claim 15 in which a sugar based sweetener is used.

19. A chewing gum composition having high film forming and good sustained softness characteristics in cud form and essentially formed from about 10 to 40 weight % of a gum base composition and about 60 to 90 weight % of a flavorant composition, said chewing gum composition containing about 12 to 44 weight % inorganic filler, said gum base composition consisting essentially of, in weight % thereof, about 5 to about 20% of elastomeric masticatory substance other than styrene butadiene elastomer and/or about 2 to about 25 % of non-elastomeric masticatory substance, about 2 to about 15% of plasticizer about 20 to about 35% of uncoated inorganic filler about 0 to about 18 % of lubricating wax about 0 to about 10% of emulsifier, and up to about 1000 ppm of each of colorant, pigment and anti-oxidant, and said flavorant composition containing sweetener and consisting essentially of, in weight % of said chewing gum composition, about 0 to about 70% sugar about 0 to about 15% sugar alcohol about 0 to about 1.5% uncoated intense sweetener, about 0.2 to about 3% of flavorant about 10 to about 30% of uncoated inorganic filler about 0 to about 4% emulsifier, and about 0 to about 2% coloring agent.

20. In a method of preparing a non-styrene-butadiene base chewing gum composition having high film forming characteristics, a high inorganic filler content in an amount of from about 12% to about 44% based on the weight of said overall gum composition, a non-styrene-butadiene based gum base in an amount of from about 15% to about 30% by weight of said gum composition, and water-soluble sweeteners, the improvement comprising:

preparing a non-styrene-butadiene based gum base which includes filler in an amount of from about 2% to about 14% by weight based on the weight of said chewing gum composition, forming a chewing gum composition with said gum base by mixing therewith other chewing gum components including inert inorganic filler in an amount of from about 10% to about 30% by weight based on the weight of said chewing gum composition whereby the overall amount of water-soluble sweeteners is reduced without reduction in the level of perceived sweetness, a high cud volume is retained during chewing, and high softness is achieved .

* * * * *